US011158112B1

United States Patent
Yeo et al.

(10) Patent No.: US 11,158,112 B1
(45) Date of Patent: Oct. 26, 2021

(54) BOUNDING VOLUME HIERARCHY GENERATION

(71) Applicant: Advanced Micro Devices, Inc., Santa Clara, CA (US)

(72) Inventors: Young In Yeo, San Diego, CA (US); Skyler Jonathon Saleh, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/114,485

(22) Filed: Dec. 7, 2020

Related U.S. Application Data

(60) Provisional application No. 63/107,166, filed on Oct. 29, 2020.

(51) Int. Cl.
*G06T 15/06* (2011.01)
*G06T 9/40* (2006.01)
*G06T 17/10* (2006.01)

(52) U.S. Cl.
CPC ........... *G06T 15/06* (2013.01); *G06T 9/40* (2013.01); *G06T 17/10* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 2003/0035576 A1* | 2/2003 | Roder | ............... | G06T 7/0004 382/147 |
| 2012/0050289 A1* | 3/2012 | Park | ............... | G06T 17/005 345/426 |
| 2014/0340412 A1* | 11/2014 | Doyle | ............... | G06T 1/20 345/522 |
| 2018/0144493 A1* | 5/2018 | Mulukutla | ............... | G06T 17/20 |
| 2020/0320776 A1* | 10/2020 | Doyle | ............... | G06T 9/001 |

OTHER PUBLICATIONS

I. Wald, "On fast Construction of SAH-based Bounding Volume Hierarchies," 2007 IEEE Symposium on Interactive Ray Tracing, 2007, pp. 33-40, doi: 10.1109/RT.2007.4342588 (Year: 2007).*
Ward, I., "On fast Construction of SAH-based Bounding Volume Hierarchies", IEEE Symposium on Interactive Ray tracing, Oct. 2007, 8 pgs., downloaded from http://www.sci.utah.edu/~wald/Publications/2007/ParalleIBVHBuild/fastbuild.pdf., on Dec. 2, 2020.

* cited by examiner

Primary Examiner — Nurun N Flora
(74) Attorney, Agent, or Firm — Volpe Koenig

(57) ABSTRACT

Techniques for performing ray tracing operations are provided. The techniques include identifying bounding-box-surface-area-weighted centroid of a group of primitives associated with a bounding box of a bounding volume hierarchy ("BVH"); generating candidate splits at the centroid, the candidate splits defining geometry subgroups; identifying a candidate split having a lowest surface area bounding box; and generating nodes for the BVH that include geometry of the geometry subgroups of the identified candidate split.

20 Claims, 10 Drawing Sheets

BOUNDING VOLUME HIERARCHY GENERATION

CROSS-REFERENCE TO RELATED APPLICATIONS

This application claims the benefit of U.S. Provisional Patent Application No. 63/107,166 filed Oct. 29, 2020 and is incorporated by reference as if fully set forth herein.

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques for performing ray tracing operations are provided. The techniques include identifying bounding-box-surface-area-weighted centroid of a group of primitives associated with a bounding box of a bounding volume hierarchy ("BVH"); generating candidate splits at the centroid, the candidate splits defining geometry subgroups; identifying a candidate split having a lowest surface area bounding box; and generating nodes for the BVH that include geometry of the geometry subgroups of the identified candidate split.

Figure 1:
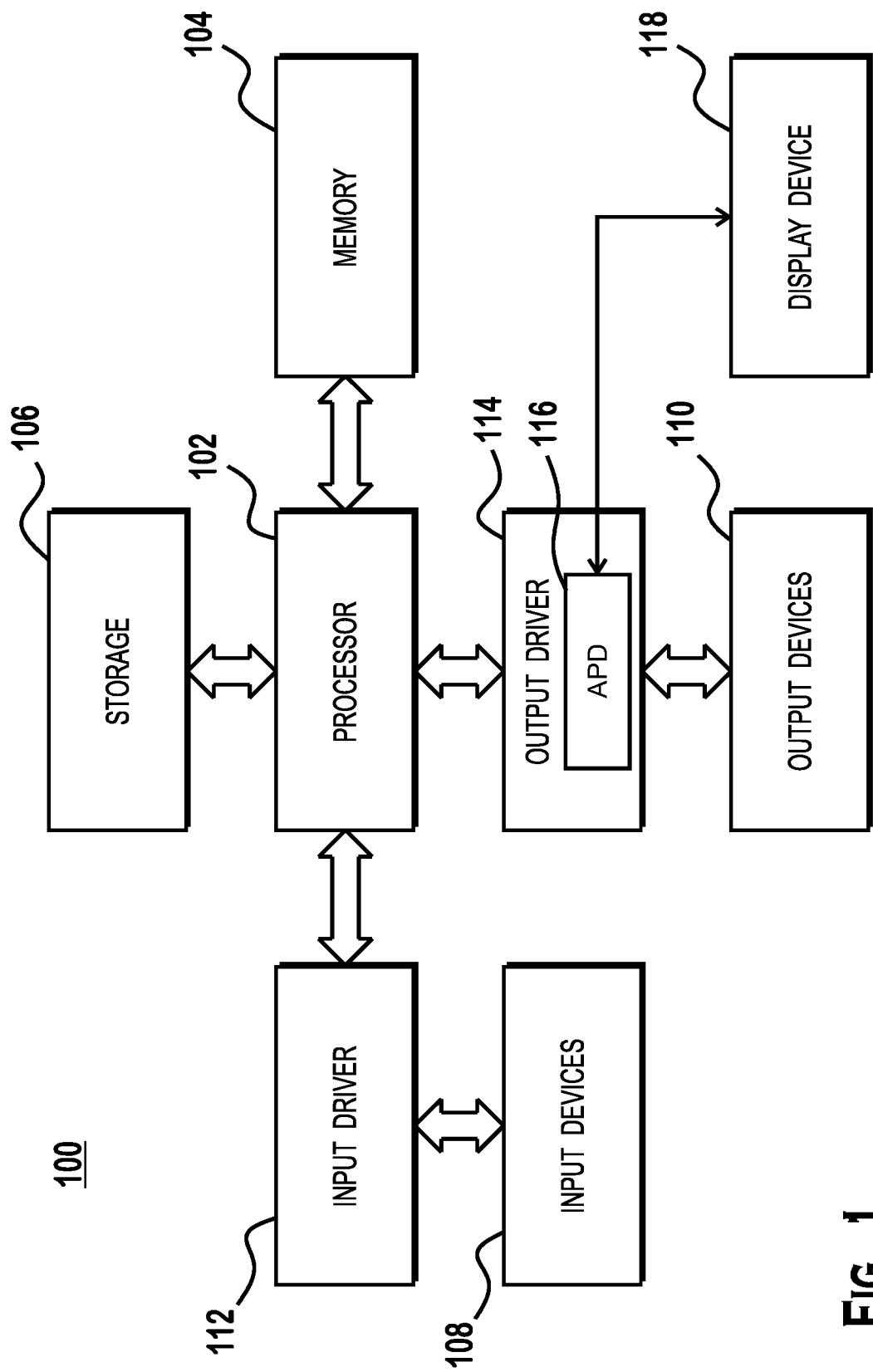
FIG. 1 is a block diagram of an example device in which one or more features of the disclosure are implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein, in different implementations, each processor core is a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated for any processing system that performs processing tasks in accordance with a SIMD paradigm to be configured to perform the functionality described herein. Alternatively, it is contemplated that computing systems that do not perform processing tasks in accordance with a SIMD paradigm performs the functionality described herein.

Figure 2:
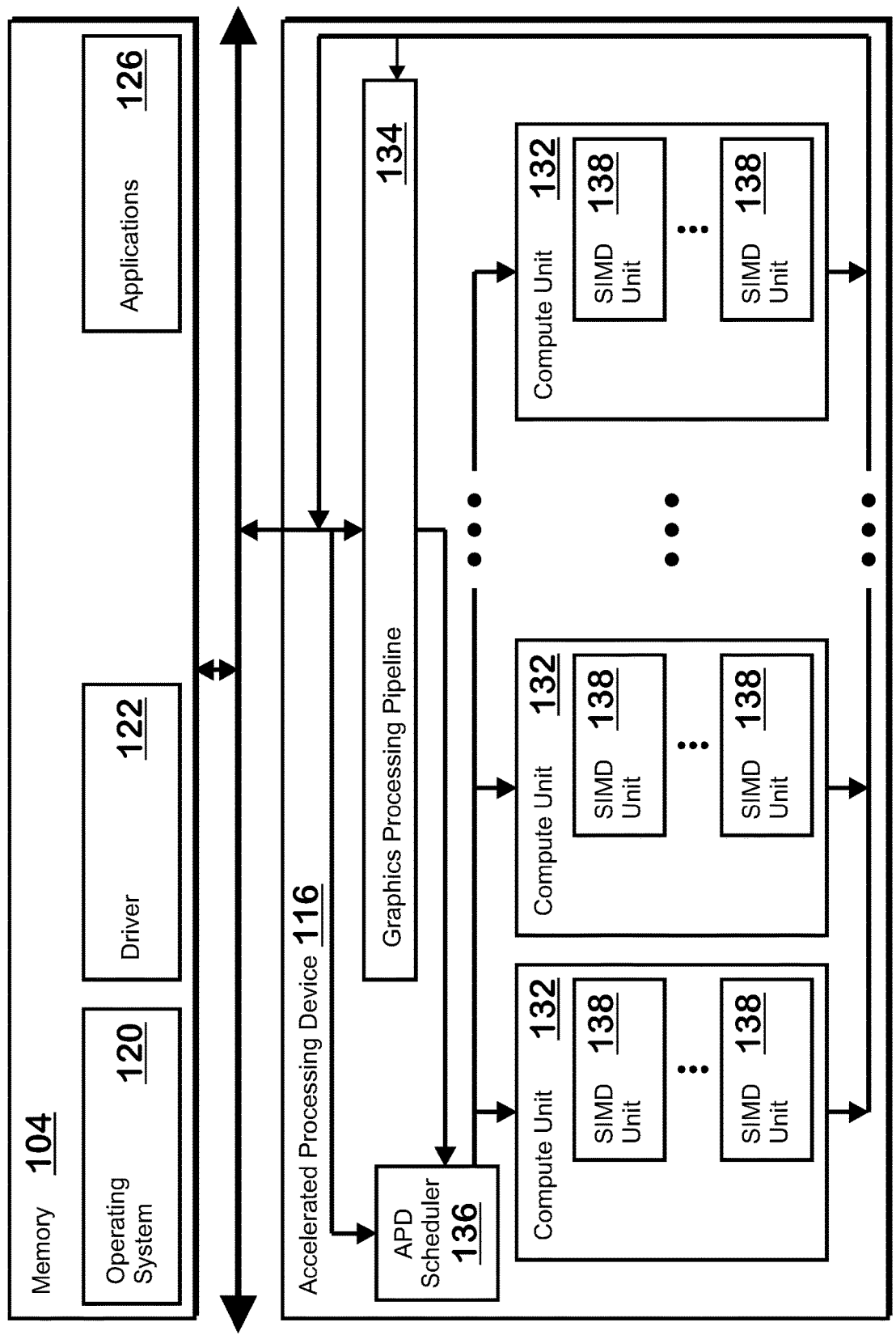
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and also, in some situations, executes other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that are suited for parallel processing. In various examples, the APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. In some examples, these compute processing operations are performed by executing compute shaders on the SIMD units 138.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but is able to execute that instruction with different data. In some situations, lanes are switched off with predication if not all lanes need to execute a given instruction. In some situations, predication is also used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. In various examples, work-items are executed simultaneously (or partially simultaneously and partially sequentially) as a "wavefront" on a single SIMD processing unit 138. One or more wavefronts are included in a "work group," which includes a collection of work-items designated to execute the same program. In some implementations, a work group is executed by executing each of the wavefronts that make up the work group. In alternatives, the wavefronts are executed on a single SIMD unit 138 or on different SIMD units 138. In some implementations, wavefronts are the largest collection of work-items that are executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The APD 116, including the compute units 132, implements ray tracing, which is a technique that renders a 3D scene by testing for intersection between simulated light rays and objects in a scene. In some implementations, much of the work involved in ray tracing is performed by programmable shader programs, executed on the SIMD units 138 in the compute units 132, as described in additional detail below.

Figure 3:
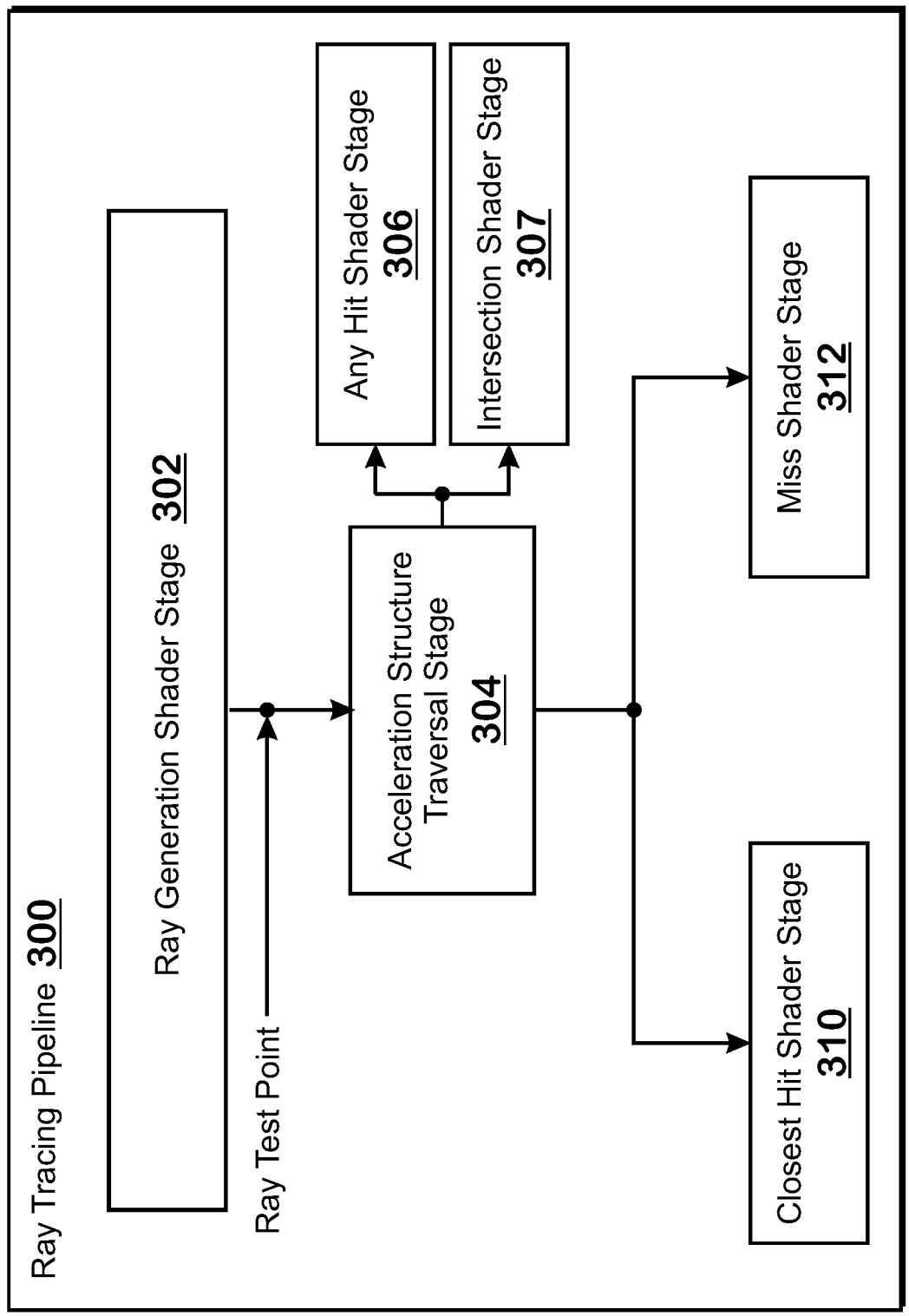
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, intersection shader 307, closest hit shader 310, and miss shader 312 are, in some implementations, shader-implemented stages that represent ray tracing pipeline stages whose functionality is performed by shader programs executing in the SIMD unit 138. In other Any of the specific shader programs at each particular shader-implemented stage are defined by application-provided code (i.e., by code provided by an application developer that is pre-compiled by an application compiler and/or compiled by the driver 122). The acceleration structure traversal stage 304 performs the ray intersection test to determine whether a ray hits a triangle. The other programmable shader stages (ray generation shader 302, any hit shader 306, closest hit shader 310, miss shader 312) are implemented as shader programs that execute on the SIMD units 138. The acceleration structure traversal stage is implemented in software (e.g., as a shader program executing on the SIMD units 138), in hardware, or as a combination of hardware and software. The ray tracing pipeline 300 is, in various implementations, orchestrated partially or fully in software or partially or fully in hardware, and, in various implementations, is orchestrated by the processor 102, the scheduler 136, by a combination thereof, or partially or fully by any other hardware and/or software unit.

In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a thing]" is used, this means that the hardware and/or software that implements the ray tracing pipeline 300 does that thing. Although described as executing on the SIMD unit 138 of FIG. 3, it should be understood that in other implementations, other hardware (such as one or more processors), having or not having SIMD capabilities (e.g., the processor 102), alternatively executes the shader programs of the illustrated ray tracing pipeline 300.

In some modes of operation, the ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene and objects within the scene, and tests the ray against triangles in the scene. In some examples, during this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. In some examples, the acceleration structure traversal stage 304 triggers execution of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 "rejects" a hit is when at least a portion of a triangle that the acceleration structure traversal stage 304 reports as being hit is fully transparent ("invisible"). In an example, the acceleration structure traversal stage 304 tests geometry and not transparency. Thus, in these examples, the any hit shader 306 that is invoked due to an intersection with a triangle having at least some transparency sometimes determines that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that, in various implementations, the shader programs defined for the closest hit shader 310 and miss shader 312 implements a wide variety of techniques for coloring ray and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. It is possible for multiple rays to be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 are used to render a scene have been described, any of a wide variety of techniques are alternatively used.

As described above, the determination of whether a ray intersects an object is referred to herein as a "ray intersection test." The ray intersection test involves shooting a ray from an origin and determining whether the ray intersects a geometric primitive (e.g., a triangle) and, if so, what distance from the origin the triangle intersection is at. For efficiency, the ray tracing test uses a representation of space referred to as an acceleration structure, such as a bounding volume hierarchy. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each typically represent different axis aligned bounding boxes that subdivide the entire region. Each of those two children has two child nodes that represent axis aligned bounding boxes that subdivide the space of their parents, and so on. Leaf nodes represent a triangle or other geometric primitive against which a ray intersection test is performed. A non-leaf node is sometimes referred to as a "box node" herein and a leaf node is sometimes referred to as a "triangle node" herein.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box are eliminated from the test. Thus, a ray intersection test is performed as a sequence of tests of the ray against axis-aligned bounding boxes, followed by tests against triangles.

Figure 4:
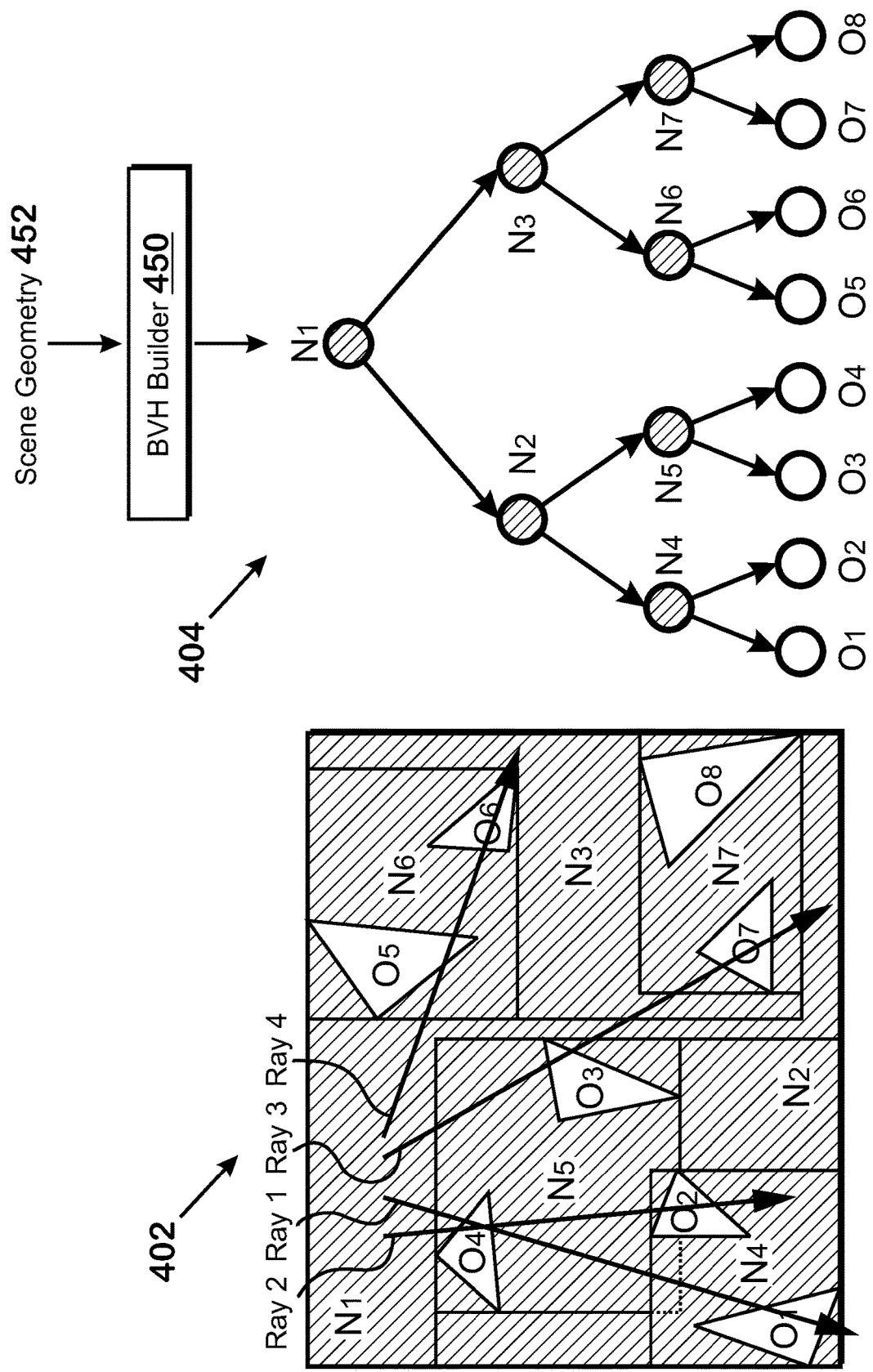
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the test for that non-leaf node fails. In an example, the ray intersects O₅ but no other triangle. The test would test against N₁, determining that that test succeeds. The test would test against N₂, determining that the test fails (since O₅ is not within N₁). The test would eliminate all sub-nodes of N₂ and would test against N₃, noting that that test succeeds. The test would test N₆ and N₇, noting that N₆ succeeds but N₇ fails. The test would test O₅ and O₆, noting that O₅ succeeds but O₆ fails Instead of testing 8 triangle tests, two triangle tests (O₅ and O₆) and five box tests (N₁, N₂, N₃, N₆, and N₇) are performed.

FIG. 4 also illustrates a bounding volume hierarchy ("BVH") builder 450, according to an example. The BVH builder 450 accepts scene geometry 452 and generates a bounding volume hierarchy 404. The scene geometry 452 includes primitives that describe a scene, which is provided by an application or other entity. The BVH builder 450 is implemented as software executing on a processor configured to perform the functionality described herein, hard-wired circuitry configured to perform the functionality described herein, or a combination of software executing on a processor and hard-wired circuitry that together are configured to perform the functionality described herein. In various examples, the BVH builder 450 is in a computer system (e.g., computer system 100), such as executing on the processor 102 or the APD 116, or is a hardware unit in the processor 102 or APD 116. In various examples, the BVH builder 450 builds the BVH at compile time, on a different computer system than the computer system that performs ray tracing using the built BVH to render a scene. In other examples, the BVH builder 450 builds the BVH at runtime, on the same computer that renders the scene using ray tracing techniques. In various examples, a driver, an application, or a hardware unit of the APD 116 performs this runtime rendering. An example technique for building a BVH is now described.

Figure 5A:
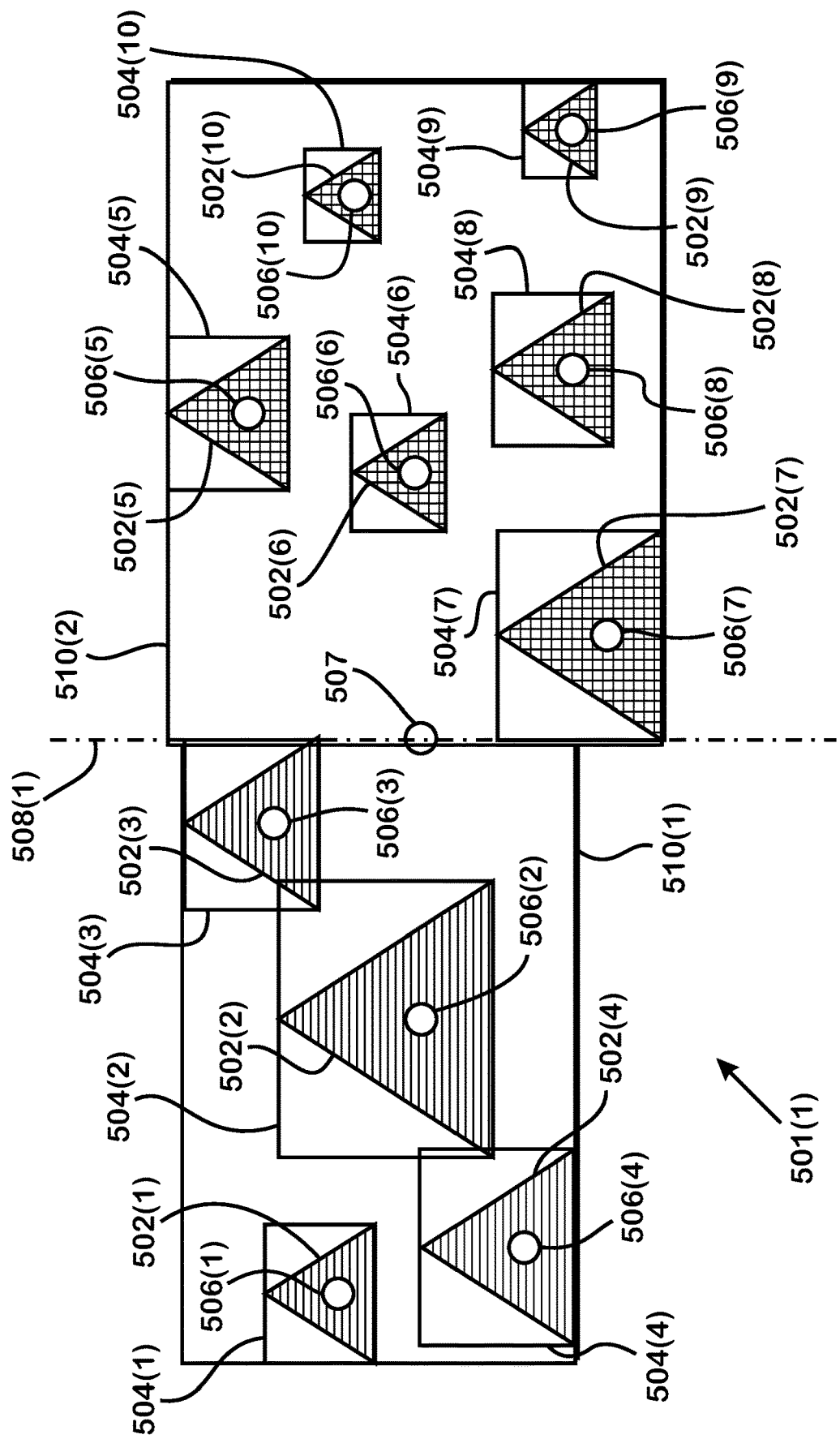
FIGS. 5A and 5B illustrates example operations for sub-dividing a scene to build a BVH, according to an example.
Figure 5B:
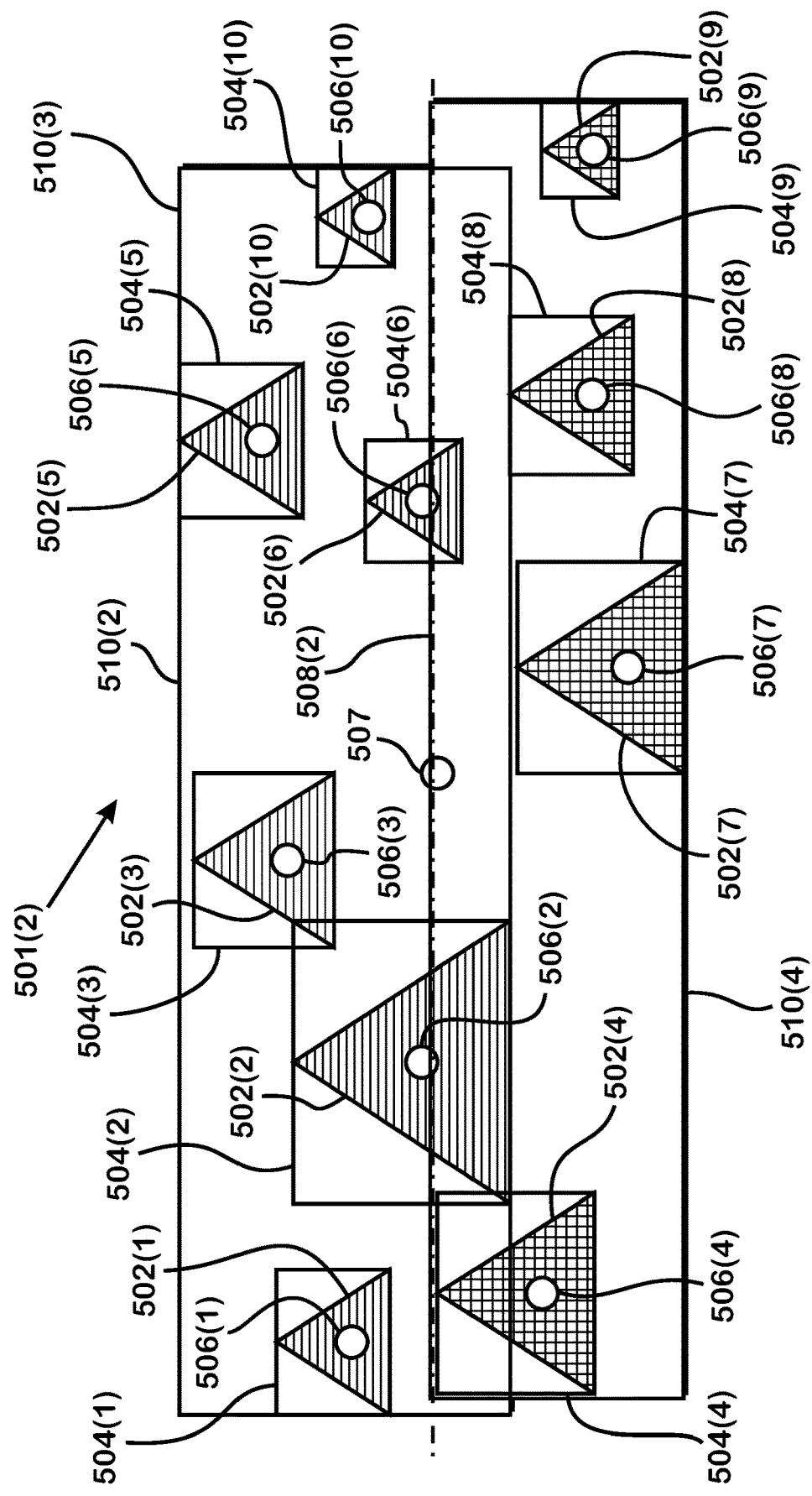

FIGS. 5A and 5B illustrates example operations for sub-dividing a scene to build a BVH, according to an example. In both of these Figures, a scene 501 is illustrated. The scene 501 includes a plurality of triangles 502. The scene 501 is the scene geometry 452 of FIG. 4. The BVH builder 450 generates a BVH based on the scene 501.

According to the technique for building a BVH, the BVH builder 450 determines centroids 506 for each of the triangles 502. In one example, the centroid is the intersection point between the lines from each vertex to the middle point of the opposing side. The BVH builder 450 also determines the axis-aligned bounding boxes 504 for each of the triangles 502. Each bounding box 504 is a box defined by the minimum and maximum extents of the triangle in each dimension.

The BVH builder 450 determines a scene centroid 507 as the bounding box surface area weighted average of all centroids of the triangles. The bounding box surface area weighted average of all centroids of the triangle is the average of the weighted centroids of the triangles 502. A weighted centroid of each triangle is the coordinates of the centroid of the triangle multiplied by the bounding box 504 of that triangle 502. The average is the sum of each such weighted centroid divided by the total surface area of the triangles 502. In equation form, this average is expressed as:

$$W_{centroid} = \frac{\sum Centroid_{tri} * SurfaceArea_{aabbOfTri}}{\sum SurfaceArea_{aabbOfTri}}$$

In this equation, $W_{centroid}$ is the scene centroid 507. $Centroid_{tri}$ is the centroid of a triangle. $SurfaceArea_{aabbOfTri}$, is the surface area of the axis aligned bounding box 504 of the triangle 502. Thus the scene centroid 507 is the sum of the centroid multiplied by bounding box surface area for each triangle 502 divided by the sum of all bounding box surface areas.

Based on the scene centroid 507, the BVH builder 450 generates several candidate slices 508 of the scene 501. A candidate slice 508 of the scene is a proposed subdivision of the triangles 502 in the scene 501 into different bounding boxes that correspond to different box nodes. The BVH builder 450 generates the different candidate slices by slicing the scene 501 with a plane that is parallel to one of the axes and that intersects the scene centroid 507. For a three-coordinate system, the BVH builder 450 thus generates three candidate slices 508—one for each axis.

Each candidate slice 508 defines two different triangle groupings. Each triangle grouping is associated with a particular side of the candidate slice 508. The BVH builder 450 assigns, to each triangle grouping, the triangles of the scene 501 whose centroids fall on the side of the candidate slice 508 associated with the triangle grouping. In FIG. 5A, the BVH builder 450 assigns triangles 502(1)-(4) to the left side triangle grouping and assigns triangles 502(5)-(10) to the right side triangle grouping, reflecting the side of the candidate slice 508 on which the centroids of those triangles 502 fall.

The BVH builder 450 determines the triangle grouping bounding boxes 510 for each triangle grouping. The triangle grouping bounding box is an axis aligned bounding box that bounds all triangles in a triangle grouping. Note that it is possible for triangle grouping bounding boxes 510 to overlap, for example, where the centroid of a triangle 502 is near to the candidate slice 508 and thus a portion of the triangle "spills over" to the other side of the candidate slice 508. For each candidate slice 508, the BVH builder 450 calculates the total surface area for each triangle grouping bounding box 510 and sums the surface area for the triangle grouping bounding boxes 510 for a particular candidate slice 508. The BVH builder 450 then selects the candidate slice 508 having the lowest total surface area for the triangle grouping bounding boxes 510 as the candidate slice 508 to use to generate a BVH branch.

The BVH builder 450 performs the operations described above with respect to FIGS. 5A-5B iteratively to generate the tree structure of the BVH 404. In each iteration, the BVH builder 450 determines how to subdivide the triangles of a given box node to generate child nodes for that box node. In each iteration, BVH builder 450 sets, as the "scene" 501 of FIGS. 5A and 5B, the triangles that fall within the bounding box of the box node being examined in that iteration, and performs the operations described with respect to FIGS. 5A and 5B. The BVH builder 450 generates children of the box node to reflect the selected candidate slice 508 and corresponding triangle groups. More specifically, the BVH builder 450 sets, as the children to that box node, a box node or leaf node corresponding to each of the generated triangle groupings. If a triangle grouping contains more than one triangle, then the child that is generated is another box node and if the triangle grouping contains one triangle, ten the child that is generated is a leaf node.

FIG. 5A reflects a candidate slice 508 made parallel to the y-axis, and FIG. 5B reflects a candidate slice 508 made parallel to the x-axis, with corresponding triangle subdivisions as shown. Because the candidate slice 508(1) of FIG. 5A is associated with the lowest total surface area (due to substantial overlap in FIG. 5B), the BVH builder 450 selects that candidate slice 508(1) to generate children of the box node that bounds all the triangles illustrated.

Note that although it is described that the candidate slices are parallel to the axes of a coordinate system, it should be understood that planes to slice the primitives could be in any orientation, as long as those planes pass through the centroid 507.

Figure 6:
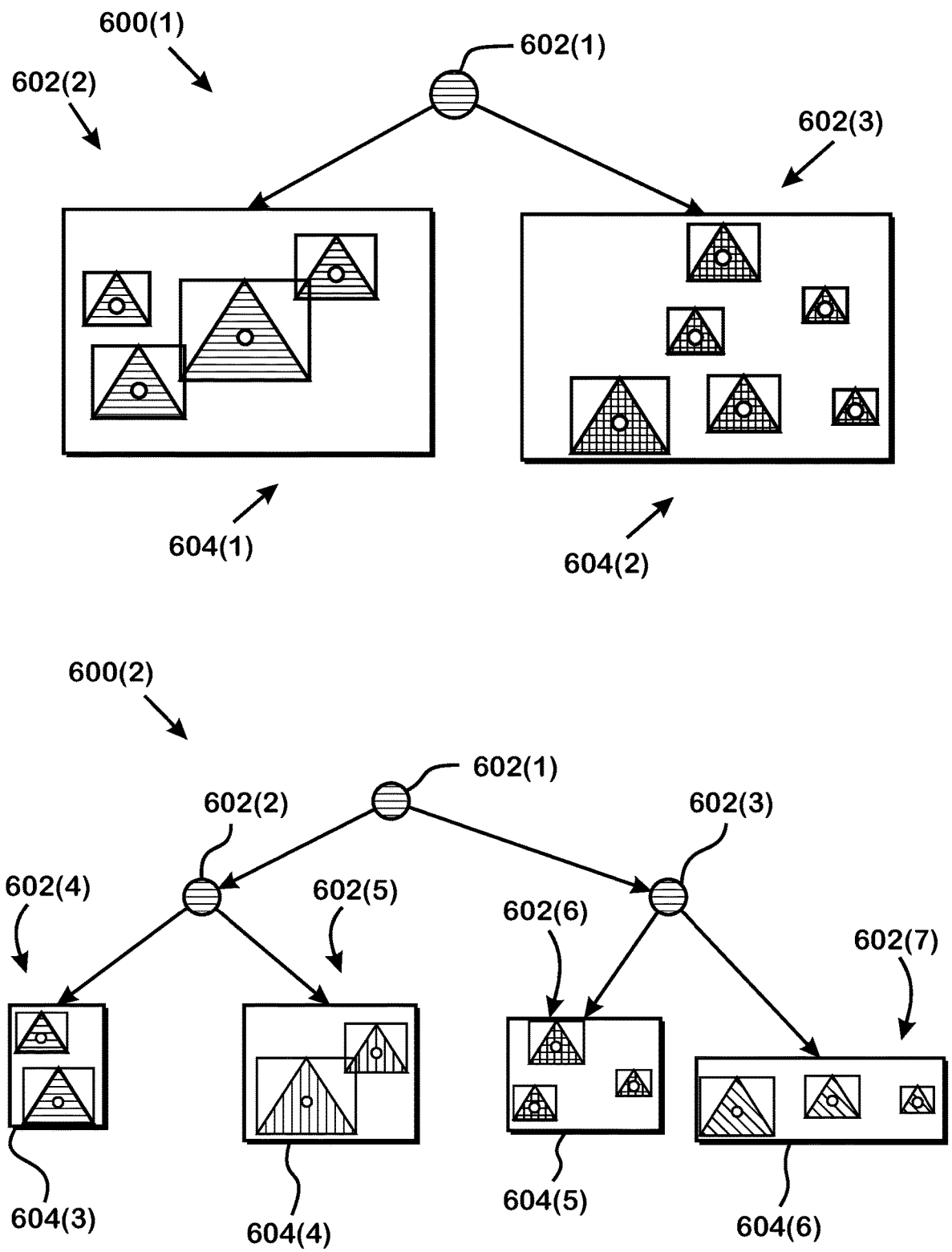
FIG. 6 illustrates example operations for building a BVH.

FIG. 6 illustrates example operations for building a BVH 404. Specifically, FIG. 6 illustrates two BVH states 600 in which the BVH builder 450 has built different portions of the BVH 404. In BVH state 1 600(1), the BVH builder 450 has already examined the geometry associated with box node 602(1). This geometry includes geometry 604(1) (for box node 602(2)) and geometry 604(2) (for box node 602(3)). The BVH builder 450 has generated box node 602(2) and box node 602(3) by splitting the geometry according to the techniques described elsewhere herein (e.g., FIGS. 5A and 5B).

The BVH builder 450 examines box node 602(2) and box node 602(3) to generate further nodes that are children of those box noes 602. For box node 602(2), the BVH builder 450 determines a split for the triangles in the geometry 604(1) for that box node 602(2) and generates new children nodes based on that split. These children nodes are shown in state 600(2). Specifically, box node 602(4) includes geometry 604(3) and box node 602(5) includes geometry 604(4). Similarly, the BVH builder 450 examines box node 602(3) to generate box node 602(6) and box node 602(7). Although not shown, additional states 600 would be performed to generate a BVH. Also, it should be understood that in the event that a split results in a single triangle, the BVH builder 450 generates a leaf node, rather than a box node.

Figure 7:
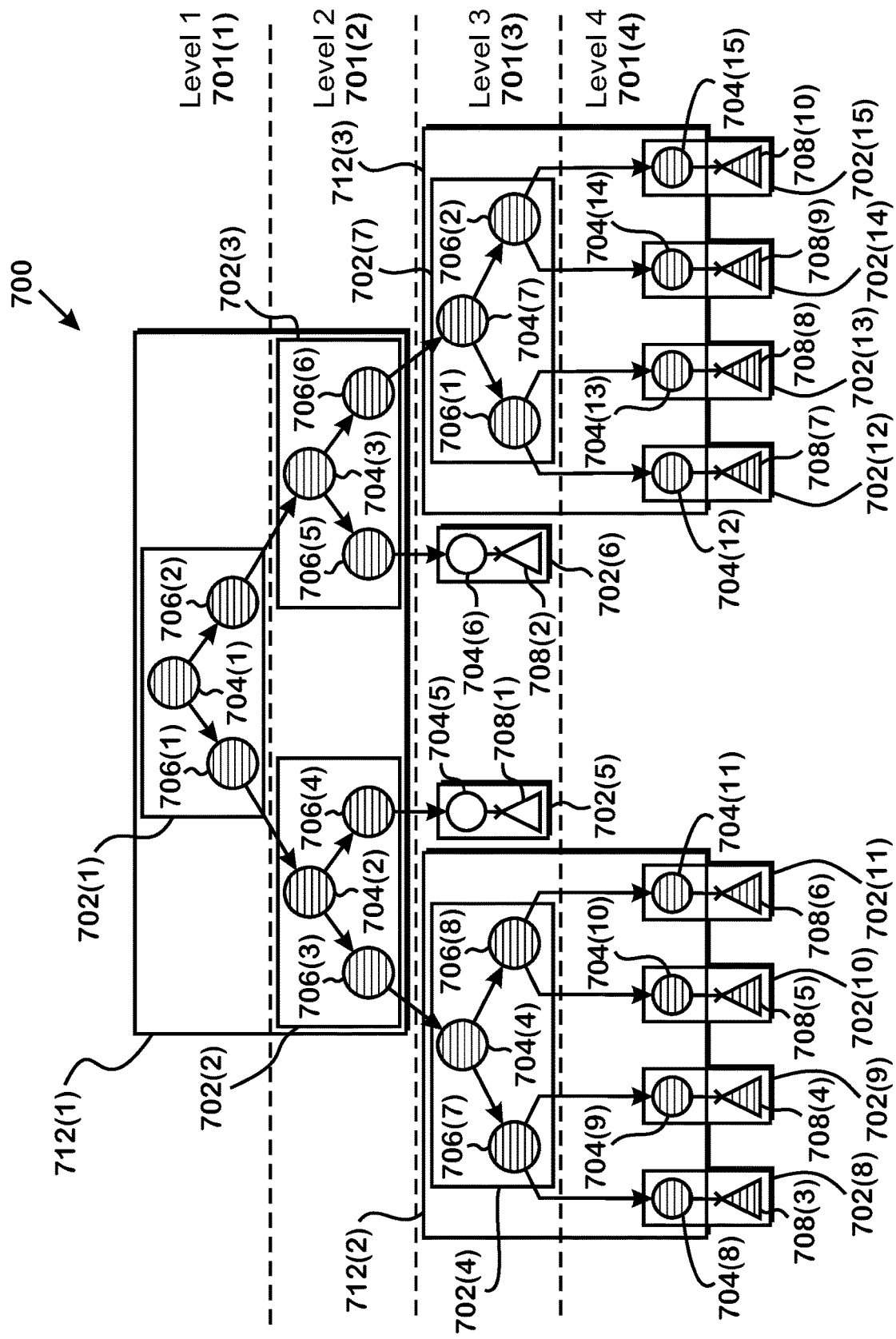
FIG. 7 illustrates an intermediate BVH according to an example.

FIG. 7 illustrates an intermediate BVH 700 according to an example. The intermediate BVH 700 is the result of the BVH builder 450 iteratively performing operations to split geometry to generate nodes until all individual triangles are assigned leaf nodes.

The BVH 700 incudes a number of nodes 702, each of which is either a box node or a triangle node. Box nodes (e.g., node 702(1)) include node identifiers 704 and node references 706 that reference other nodes 702. Triangle nodes (e.g., node 702(5)) include node identifiers 704 and triangle data 708 that describes the geometry (and potentially other information) of a triangle for that triangle node.

In the example of FIG. 7, box node 702(1) includes box node identifier 704(1), which points to node reference 706(1) and node reference 706(2). Node reference 706(1) points to box node 702(2) and node reference 706(2). Box node 702(2) includes box node identifier 704(2), which points to node reference 706(3) and node reference 706(4). Node reference 706(3) points to box node 702(4) and node reference 706(4) points to triangle node 702(5). Triangle node 702(5) includes node identifier 704(5), which points to triangle data 708(1).

The BVH builder 450 converts the intermediate BVH 700 to a consolidated BVH in the following manner. The BVH builder 450 identifies levels 701 of the BVH 700. A level is a portion of the BVH 700 at the same number of references down from the top-most box node 702. In the BVH 700 of FIG. 7, level 1 701(1) includes node 702(1). Level 2 701(2) includes node 702(2) and node 702(3). Level 3 701(3) includes node 702(4), node 702(5), node 702(6), and node 702(7). Level 4 701(4) includes nodes 702(8) through 702 (15).

The BVH builder 450 consolidates box nodes at multiple levels 701 to generate consolidated box nodes. In an example, the BVH builder 450 consolidates an odd level 701 with the immediately next even level. In an example, the BVH builder 450 consolidates level 1 701(1) and level 2 701(2). Specifically, the BVH builder generates consolidated nodes by combining a node 702 from the upper such level 701 (the odd level 701) with the box node children 702 of that node in the lower level 701 (the even level 701) to generate a new box node. The BVH builder 450 does not combine triangle nodes with box nodes in such a manner. The consolidated box node includes all node references 706 of the top level 701. The result is new box nodes that include more node references 706 than the box nodes of the BVH 700, as well as a reduction in levels 701.

Figure 8:
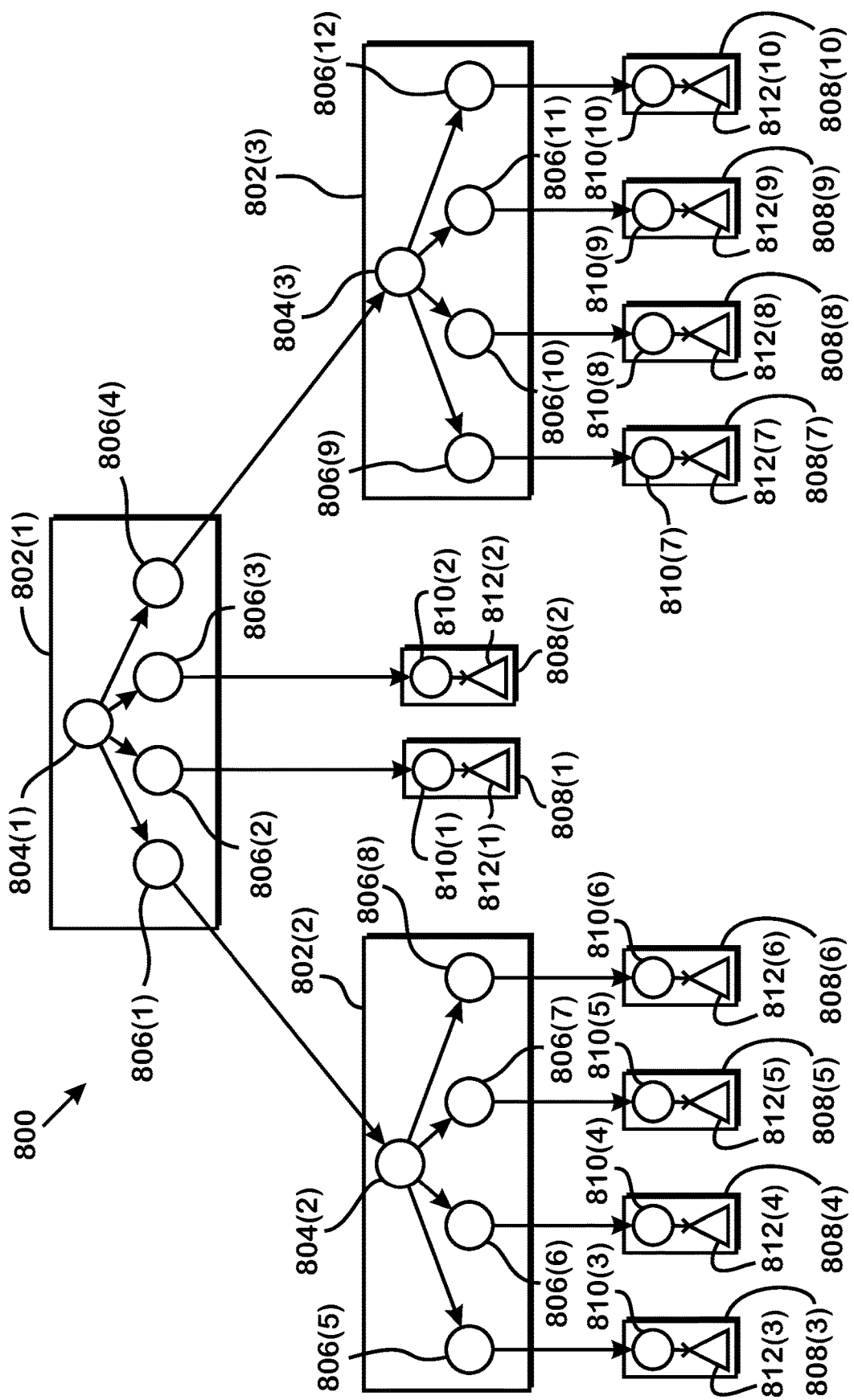
FIG. 8 illustrates a consolidated BVH, according to an example.

FIG. 8 illustrates a consolidated BVH 800, according to an example. The BVH 800 includes box nodes 802 and triangle nodes 808. The box nodes 802 include box node identifiers 804, and node references 806. The triangle nodes 808 include triangle node identifiers 810 and triangle data 812.

The triangle nodes 808 are similar to the triangle nodes (e.g., node 702(5) of FIG. 7. The box nodes 802 are similar to the box nodes (e.g., 702(1) of FIG. 7), except that the box nodes 802 include more node references 806 than the box nodes of FIG. 7.

The BVH builder 450 generates a consolidated BVH 800 from an intermediate BVH 700 as described above with respect to FIG. 7. The example consolidated BVH 800 of FIG. 8 is generated from the intermediate BVH 700 of FIG. 7. Specifically, box node 802(1) is generated from level 1 701(1) and level 2 702(2). More specifically, the BVH builder 450 generates box node 801(1) starting with box node 702(1). The BVH builder 450 determines that box node 702(1) includes node reference 706(1) and node reference 706(2). Thus, the BVH builder 450 identifies the nodes 702 pointed to by those node references. In FIG. 7, the node 702 pointed to by node reference 706(1) is node 702(2) and the node 702 pointed to by node reference 706(2) is node 702(3). The BVH builder 450 identifies the node references 706 in these nodes 702 and includes these node references in the box node 802 being generated, thus combining two levels 701 into one level 701 and converting box nodes 702 having two node references 706 into box noes 802 having four references 806 (though it should be understood that box nodes 702 may have fewer than two node references 706 and thus box nodes 802 may have fewer than four node references 806).

For node references 706 that point to triangle nodes, the BVH builder 450 includes those node references 706 into the consolidated box node 802 as well. For example, box node 702(4) has two node references 706 that point to triangle nodes (nodes 702(8)-702(11)). Thus, the BVH builder 450 includes these node references 706 into the consolidated box node 802. In the manner described, the BVH builder 450 generates box node 802(1), box node 802(2) (from box node 702(4) and triangle nodes 702(8)-702(11)), and box node 802(3) (from box node 702(7), and triangle nodes 702(12)-702(15)).

The triangle nodes in the consolidated BVH 800 are unmodified as compared with the BVH 700. However, in some implementations, the BVH builder 450 compresses these triangle nodes 808 to generate compressed triangle nodes (not shown). In an example, a compressed triangle node includes data for multiple triangles, with shared vertices being represented a smaller number of times than the number of instances that those vertices appear in all triangles in the compressed triangle node. For example, if two triangles that share one vertex are included in a compressed triangle node, then the BVH builder 450 includes those triangles into the compressed triangle node, including only one instance of the data (e.g., position) for that shared vertex. In another example, three or four triangles that all share one vertex included and only one instance (rather than three or four instances) of that vertex in the compressed triangle node. In addition, the BVH builder 450 converts references to the triangle nodes 808 to references to the compressed triangle nodes. It is therefore possible for multiple node references 806 to point to the same compressed triangle node (although different triangles in that compressed triangle node).

The BVH builder 450 gives the box nodes 802 of FIG. 8 bouncing boxes that enclose all triangles that are descendants of those box nodes 802.

Although it has been described that the BVH builder 450 generates consolidated box nodes 802 from two levels 701 of the intermediate BVH 700, in some implementations, the BVH builder 450 generates consolidated box nodes from more than two levels 701 of the intermediate BVH 700. In such instances, the consolidated box nodes include all node references 706 from box nodes 702 at the lowest layer 701 being consolidated that is not a triangle node that descend from a particular box node 702 at the top-most layer 701. In an example, a box node 702 at a particular layer has six box nodes at the level 3 layer 701 that descend from that box node 702. The BVH builder 450 generates a consolidated box node that includes all of the node references 706 in those six box nodes.

Although triangles are sometimes described as the geometry included within leaf nodes, it is possible for leaf nodes to include any type of geometry or to even specify an intersection test with code rather than with shape information.

Figure 9:
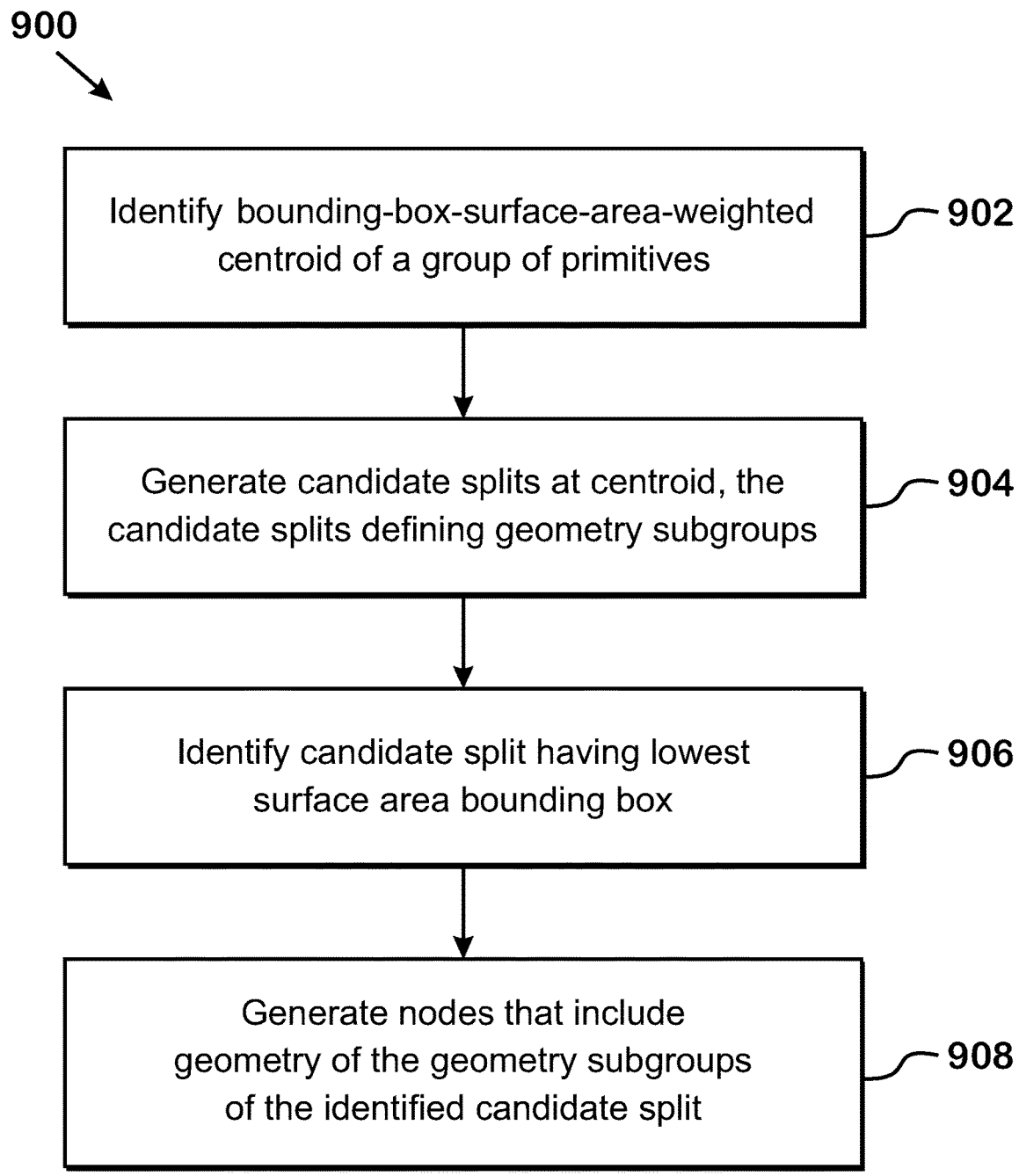
FIG. 9 is a flow diagram of a method for generating a bounding volume hierarchy, according to an example.

FIG. 9 is a flow diagram of a method 900 for generating a bounding volume hierarchy, according to an example. Although described with respect to the system of FIGS. 1-8, those of skill in the art will recognize that any system, configured to perform the steps of the method 900 in any technically feasible order, falls within the scope of the present disclosure.

The method 900 begins at step 902, where the BVH builder 450 identifies a bounding-box-surface-area-weighted centroid of a group of primitives. This centroid is the centroid 507 of FIGS. 5A and 5B, and identifying this centroid is described elsewhere herein. The group of primitives is a group of primitives bounded by the bounding box of a box node, such as the top-most node of a BVH or a different box node of the BVH.

At step 904, the BVH builder 450 generates candidate splits at the centroid. The candidate splits define geometry subgroups. In an example, the candidate splits are performed by splitting the geometry with planes parallel to each of the axes (x, y, and z) that pass through the centroid 507.

At step 906, the BVH builder 450 identifies the candidate split having the lowest surface area bounding box. For each split, the geometry is divided into two groups, each falling on a different side of the plane. Then, an axis aligned bounding box is determined for each group, where each box encloses all geometry of that group. The split where the sum of the surface area of the two bounding boxes is the lowest is the identified candidate split.

At step 908, the BVH builder 450 generates nodes that include geometry of the subgroups of the identified candidate split. In an example, if a group includes one primitive, then the BVH builder 450 generates a triangle node for that group. If a group includes two or more primitives, then the BVH builder 450 generates a box node having a bounding box that bounds the two or more primitives. The BVH builder 450 also adds node references to the box node associated with the geometry that was split, where the generated node references point to the newly generated nodes.

The BVH builder 450 repeats the method 900 to generate a full BVH. In an example, the BVH builder 450 repeats the method 900 until all groups have been split and triangle nodes exist at the bottom-most node of each branch of the BVH.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:
   identifying bounding-box-surface-area-weighted centroid of a group of primitives associated with a bounding box of a bounding volume hierarchy ("BVH");
   generating candidate splits at the centroid, the candidate splits defining geometry subgroups;
   identifying a candidate split having a lowest surface area bounding box; and
   generating nodes for the BVH that include geometry of the geometry subgroups of the identified candidate split.

2. The method of claim 1, wherein identifying the bounding-box-surface-area-weighted centroid of the group of primitives comprises:
  identifying a point defined by a bounding-box-weighted average of centroid positions of the group of primitives.

3. The method of claim 1, wherein generating the candidate splits comprises:
  identifying a plurality of subdividing planes parallel to a coordinate axis and that intersect the centroid; and
  generating a plurality of primitive subgroups from the group of primitives, the subgroups defined based on which side of a subdividing plane the primitives are located.

4. The method of claim 1, wherein identifying the candidate split having the lowest surface area bounding box comprises:
  for each candidate split of the candidate splits:
    identifying bounding boxes that bound all primitives on each side of a subdividing plane for the candidate split; and
    adding the surface areas of the bounding boxes to obtain a surface area sum for the candidate split, and
  selecting the candidate split that has the lowest surface area sum.

5. The method of claim 1, wherein generating the nodes comprises:
  for a geometry subgroup that includes one primitive, generating a leaf node, and for a geometry subgroup that includes more than one primitive, generating a box node.

6. The method of claim 1, further comprising:
  compressing triangle nodes of the BVH by combining triangle nodes having triangles that share a vertex.

7. The method of claim 1, further comprising:
  converting the BVH to a consolidated BVH by consolidating box nodes and levels of the BVH to generate consolidated box nodes.

8. The method of claim 1, further comprising:
  repeating the identifying the bounding-box-surface-area-weighted centroid, generating, identifying the candidate split, and generating nodes to generate multiple box nodes for the BVH.

9. The method of claim 8, further comprising:
  generating the multiple box nodes for the BVH until all bottom-most nodes of all branches of the BVH are nodes for single geometry.

10. A device configured to build a bounding volume hierarchy ("BVH"), the device comprising:
  a memory storing a BVH; and
  a BVH builder, configured to:
    identify bounding-box-surface-area-weighted centroid of a group of primitives associated with a bounding box of the BVH;
    generate candidate splits at the centroid, the candidate splits defining geometry subgroups;
    identify a candidate split having a lowest surface area bounding box; and
    generate nodes for the BVH that include geometry of the geometry subgroups of the identified candidate split.

11. The device of claim 10, wherein identifying the bounding-box-surface-area-weighted centroid of the group of primitives comprises:
  identifying a point defined by a bounding-box-weighted average of centroid positions of the group of primitives.

12. The device of claim 10, wherein generating the candidate splits comprises:
  identifying a plurality of subdividing planes parallel to a coordinate axis and that intersect the centroid; and
  generating a plurality of primitive subgroups from the group of primitives, the subgroups defined based on which side of a subdividing plane the primitives are located.

13. The device of claim 10, wherein identifying the candidate split having the lowest surface area bounding box comprises:
  for each candidate split of the candidate splits:
    identifying bounding boxes that bound all primitives on each side of a subdividing plane for the candidate split; and
    adding the surface areas of the bounding boxes to obtain a surface area sum for the candidate split, and
  selecting the candidate split that has the lowest surface area sum.

14. The device of claim 10, wherein generating the nodes comprises:
  for a geometry subgroup that includes one primitive, generating a leaf node, and for a geometry subgroup that includes more than one primitive, generating a box node.

15. The device of claim 10, wherein the BVH builder is further configured to:
  compress triangle nodes of the BVH by combining triangle nodes having triangles that share a vertex.

16. The device of claim 10, wherein the BVH builder is further configured to:
  converting the BVH to a consolidated BVH by consolidating box nodes and levels of the BVH to generate consolidated box nodes.

17. The device of claim 10, wherein the BVH builder is further configured to:
  repeating the identifying the bounding-box-surface-area-weighted centroid, generating, identifying the candidate split, and generating nodes to generate multiple box nodes for the BVH.

18. The device of claim 17, wherein the BVH builder is further configured to:
  generating the multiple box nodes for the BVH until all bottom-most nodes of all branches of the BVH are nodes for single geometry.

19. A non-transitory computer-readable medium storing instructions that, when executed by a processor, cause the processor to:
  identify bounding-box-surface-area-weighted centroid of a group of primitives associated with a bounding box of a bounding volume hierarchy ("BVH");
  generate candidate splits at the centroid, the candidate splits defining geometry subgroups;
  identify a candidate split having a lowest surface area bounding box; and
  generate nodes for the BVH that include geometry of the geometry subgroups of the identified candidate split.

20. The non-transitory computer-readable medium of claim 19, wherein identifying the bounding-box-surface-area-weighted centroid of the group of primitives comprises:
  identifying a point defined by a bounding-box-weighted average of centroid positions of the group of primitives.

* * * * *